United States Patent [19]
Thornton

[11] Patent Number: 5,003,310
[45] Date of Patent: Mar. 26, 1991

[54] ANALOG DATA ACQUISITION CIRCUIT WITH DIGITAL LOGIC CONTROL

[75] Inventor: Roger D. Thornton, Union Township, Auglaize County, Ohio

[73] Assignee: Westinghouse Electric Corp., Pittsburgh, Pa.

[21] Appl. No.: 414,878

[22] Filed: Sep. 29, 1989

[51] Int. Cl.$^5$ ............................................. H03M 1/12
[52] U.S. Cl. ..................................... 341/141; 341/155
[58] Field of Search ................ 341/141, 155; 307/273; 328/207; 365/189.01, 189.02, 189.08, 233, 233.5

[56] References Cited

U.S. PATENT DOCUMENTS

| | | | |
|---|---|---|---|
| 3,806,916 | 4/1974 | Diaz et al. | 341/141 |
| 3,962,689 | 6/1976 | Brunson | 365/233 |
| 4,287,577 | 9/1981 | Deal, Jr. | 365/233 |
| 4,400,801 | 8/1983 | Kible | 365/189.03 |
| 4,742,515 | 5/1988 | Dabholkar | 341/141 XR |
| 4,800,304 | 1/1989 | Takeuchi | 365/233.5 |
| 4,829,475 | 5/1989 | Ward et al. | 365/233.5 |
| 4,933,676 | 6/1990 | Hauge et al. | 341/155 XR |

OTHER PUBLICATIONS

Analog Devices, Inc., "Analog-Digital Conversion Handbook" 1986 pp. 36; 37 and 67-106.
Hybrid Systems Corp., Bulletin HS 9403/8M/08-85, HS 9403, 16-Channel, 12-Bit Data Acquisition System.

Primary Examiner—William M. Shoop, Jr.
Assistant Examiner—H. L. Williams
Attorney, Agent, or Firm—R. P. Lenart

[57] ABSTRACT

A data acquisition for use in a high-speed data bus interface is provided with an analog acquisition circuit having analog inputs, digital outputs, a load terminal, an end-of-conversion terminal, a strobe terminal, a multiplex address output and a channel select input. A static random access memory receives data produced at the digital output of the analog acquisition circuit and stores it in addresses corresponding to the multiplexed address outputs of the analog acquisition circuit. A simple logic control circuit having an AND gate, an OR gate and a one shot circuit is connected to control the operation of the analog acquisition to provide self-starting and free running operation with synchronous turn on and turn off to prevent data contamination when the circuit is stopped.

3 Claims, 1 Drawing Sheet

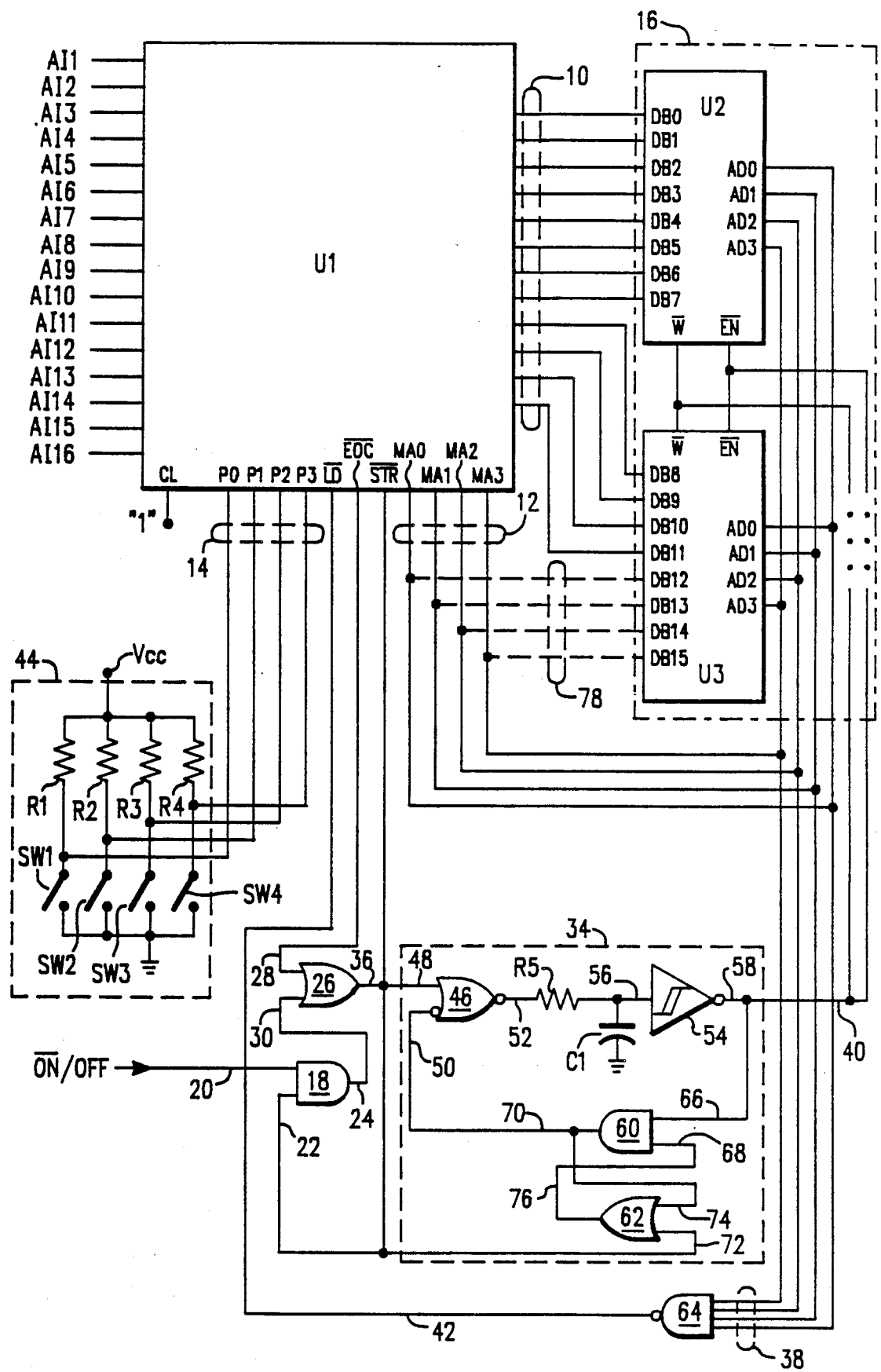

ANALOG DATA ACQUISITION CIRCUIT WITH DIGITAL LOGIC CONTROL

BACKGROUND OF THE INVENTION

This invention relates to data acquisition circuits, and, more particularly, to analog data acquisition circuits which are used to monitor the operational status of relatively simple electronic equipment.

Advances in solid state power electronics have allowed the increased use of sophisticated power conversion and switching devices in evermore complex and reliable power systems. As electronic power conversion and switching techniques improve and the numbers and functional capability of the associated devices increases, the need for a simple and reliable method of monitoring and controlling large numbers of these devices has developed. Moreover, these devices are often remotely located with respect to a central controller as well as other similar power system equipment. The method of linking the central controller to the remote power control devices is often a high speed data or communication bus with a specific protocol and format. One such data bus was established by military standard MIL-STD-1553B. The use of such a communication link provides a reliable method of transmitting control data to, and receiving status data from, various components throughout the system. A further advantage of the data bus approach is a reduction in weight and complexity of the interconnections within the power system. While the use of a high speed data bus has many advantages at the system level, one draw back is an increase in complexity of the equipment which must now interface with the data bus, usually as remote terminals.

A prior approach to the interface design involves the use of a standard interface circuit which contains the transceivers and protocol logic for the particular data bus. A microprocessor is generally the other major item required to decipher the incoming commands and provide the timing and control logic for transferring the data to the subsystem (controlled device) as well as for the retrieval and storage of data for transmission on the data bus. Usually a quick response requested by a high speed data bus requires a fast (high clock frequency) microprocessor with 16 bit wide data words to meet the interface requirements. This works well for a complex piece of equipment already containing a microprocessor where the only major addition to the unit is the specific interface circuit for the application. Many of the more advanced transceiver circuits are designed for microprocessor based applications with the required control and status signals for various processor types available. A problem arises when the equipment to be controlled is simple, such as a solid state relay with variable current limiting. The internal control logic for such a device is simple and is not based on a microprocessor. The addition of a processor for interface purposes would substantially increase the complexity and cost while lowering the reliability of the device. A further area of concern lies in the implementation of a microprocessor system. A circuit of interdependent, clocked devices could represent a problem in the electrically noisy environment inside a solid state power conversion or switching device.

An alternative to a full microprocessor based interface design must be flexible but not at the expense of simplicity. The interface design should not be more complex than the host device, but it must provide many of the desirable features of a more complex data bus interface design. These features include digital and analog data acquisition, digital and possibly analog data outputs, and enough flexibility to allow common application in many different types of simple power conversion and switching equipment. In addition, the design must be noise immune and small in size to be compatible with the application. Such high speed data bus interfaces require the capability for acquiring analog data on a continuous basis. It is desirable to sense, digitize and store multiple analog signals for metering and monitoring of electrically simple power system components such as remote power controllers, remote bus interfaces, and solid state power controllers. Due to a relatively large number of these types of components in a typical power system, each of which would be communicating directly with a common high speed data bus controller, there is a desire to minimize data transmission time and overhead in the controlling device. Typical data acquisition systems for these applications use one of two usual methods of data collection with power system components in a complex system. The first is a dedicated wire from the monitor point to the metering device. While this is the most simple, direct approach, it becomes unmanageable when multiplied by tens or hundreds of metering points. Such an approach would ultimately sacrifice overall system weight and simplicity. A second approach is used when the power system component is electrically complex, (i.e., contains a microprocessor) and the analog data is multiplexed into the equipment hardware via the normal data acquisition techniques typical of microprocessor based designs.

The above methods of analog data acquisition are not acceptable for use in power systems having simple components where the number of dedicated wires would be prohibitive and a microprocessor is not used in the basic equipment design. Such high speed data bus interfaces require a free standing analog data acquisition circuit capable of monitoring a preselected number of channels (for example, 16) of data at a speed compatible with the operating frequency of the power system which may range between DC and 20 kHz. The circuit must be self starting and astable in operation since no outside control logic is found in the monitored devices. The circuit must also be gated (i.e. turned on and off) by signals from a data bus transceiver. In addition, the circuit must provide accuracy adequate for the application, with a digital output for data bus interface compatibility. The data must be formatted in such a way as to minimize data bus traffic and reduce data bus controller overhead. The present invention seeks to provide a simple high speed data bus interface which contains the above attributes.

SUMMARY OF THE INVENTION

This invention provides a data acquisition circuit for a simple data bus interface which uses a standard analog acquisition hybrid circuit coupled with unique control logic to provide a stand alone free-running, gated data acquisition function for the data bus interface.

Circuits constructed in accordance with this invention include an analog acquisition circuit having a plurality of analog inputs, a plurality of digital outputs, a load count terminal, an end-of-conversion terminal, a strobe, or start conversion terminal, a multiplex address output and a channel select input. A static random access memory is connected to the digital outputs of the analog acquisition circuit and includes write and enabled terminals, and an address input connected to the multiplex address output of the analog acquisition circuit. The circuit also includes an AND logic gate, an OR logic gate and a one shot circuit. The AND logic gate has a first input for receiving an ON/OFF control signal, a second input connected to the strobe output of the analog acquisition circuit, and an output. The OR logic gate has a first input connected to the end-of-conversion terminal of the analog acquisition circuit, a second input connected to the output of the AND gate, and an output connected to the strobe output of the analog acquisition circuit. The one shot circuit has a first pair of inputs connected to the strobe output of the analog acquisition circuit and an output connected to the enable and write terminals of the static random access memory.

In response to an ON/OFF control signal, the data acquisition circuit sequentially receives analog data from the monitored devices and converts it into digital data which is stored in the static random access memory. This function is performed without the need for microprocessor based interface circuits within the monitored devices.

BRIEF DESCRIPTION OF THE DRAWINGS

The present invention will be more readily apparent from the following description of the preferred embodiment thereof, shown by way of example, in the single figure which is a schematic diagram of the preferred embodiment of the invention.

DESCRIPTION OF THE PREFERRED EMBODIMENT

Referring to the drawing, the single figure is a schematic diagram of the preferred embodiment of the present invention. A hybrid analog acquisition circuit U1 is provided with a plurality of analog inputs AI1 ... AIN; a 12 bit digital output 10; a load terminal $\overline{LD}$; an end-of-conversion terminal $\overline{EOC}$; a strobe terminal $\overline{STR}$; a four bit multiplex address output 12; a four bit channel select input 14; and a clear terminal CL. A static random access memory 16 including integrated circuits U2 and U3 is connected to receive the 12 bit digital output of the hybrid analog acquisition U1 at the addresses specified by the multiplex address output 12. An AND logic gate 18 has a first input 20 for receiving an ON/OFF control signal, a second input 22 connected to the strobe terminal of the analog acquisition circuit and an output 24. An OR logic gate 26 includes a first input 28 connected to the end of conversion terminal of the analog acquisition circuit, a second input 30 connected to the output of the AND gate and an output 32 connected to the strobe terminal of the analog acquisition circuit. A one shot circuit 34 includes a first input 36 connected to the strobe terminal of the analog acquisition circuit, and an output 40 connected to the write $\overline{W}$ and enable $\overline{EN}$ terminals of random access memories U2 and U3.

In the preferred embodiment, the hybrid analog acquisition circuit is a 16 channel, 12 bit data acquisition system number HS9403, available from Hybrid Systems Corporation 22, Linnell Circle, Billerica, Mass., 01821. That circuit is capable of both random address and triggered sequential address operation. In the random address mode, the load terminal is set to a logic 0 and the next falling edge on the strobe terminal will load the multiplexer channel address with the binary data present on terminals P0, P1, P2 and P3. In the triggered sequential address mode, the load terminal and the clear terminal are set to a logic 1, then applying a falling edge trigger pulse to the strobe terminal causes the contents of the address counter to be incremented by 1 following an A to D conversion. The present invention uses a simple logic circuit to control the operation of the hybrid analog acquisition circuit as follows: Initial channel selection is set by using a channel selection circuit 44, comprising resistors R1, R2, R3 and R4 and switches S1, S2, S3 and S4 to provide a binary input to address inputs P0, P1, P2 and P3. The analog acquisition circuit then sequentially converts the channels of analog input to digital outputs until the multiplex channel address on lines 12 becomes all logic ones. At that point, the output 42 of NAND gate 64 goes to a logic 0 and the hybrid analog acquisition circuit is reset to the first analog input channels specified by channel selection circuit 44.

The one shot circuit 34 includes a NOR circuit 46 having a first input 48 connected to the strobe terminal of the analog acquisition circuit, an inverting input 50 and an output 52. A trigger circuit 54 has an input 56 and an output 58 connected to the enable and Write terminals of the static random access memory U2 and U3. A time delay circuit comprising resistor R5 and capacitor C1 is connected between the NOR circuit and the input of the trigger circuit. The one shot also includes a second AND gate 60 and a second OR gate 62. The second AND gate has a first input 66 connected to the output of the trigger circuit, a second input 68 and an output 70 connected to the inverting input of the NOR circuit. The second OR gate has a first input 72 connected to the strobe terminal of the analog acquisition circuit, a second input 74 connected to the output of the second AND gate 60 and an output 76 connected to the second input of the second AND logic gate. The NAND gate 64 has a plurality of inputs 38 connected to the multiplex address output of the analog acquisition circuit and an output 42 connected to the load terminal of the analog acquisition circuit.

In the preferred embodiment, the hybrid analog acquisition circuit U1 performs the digitizing function with the resulting data being stored in static random access memories U2 and U3. The gating or turn ON/OFF control required by the high speed data buss interface is performed by logic gates 18 and 26. The feedback signal from the output of gate 26 to the input of gate 18 provides for synchronous shutdown of the circuit allowing completion of the interrupted conversion cycle. The self-clearing one shot including trigger 54 is implemented with logic gates 46, 60 and 62, resistor R5 and capacitor C1 connected as illustrated. This circuit allows flexibility in the timing requirements of the analog acquisition circuit U1 and the static random access memory U2 and U3. Resistor R5 and capacitor C1 set the length of the write and enable pulses and well as provide a small delay prior to writing the digital data to allow the acquisition circuit to stabilize and the data to become valid. Furthermore, any data or address set up and hold times required by the memory can be provided by this delay line. Depending on the logic family and delay length, it may be desirable to select a Schmidt trigger for the input of the trigger circuit 54. As can be seen, the logic circuit of the preferred embodiment is considerably more simple than a microprocessor based application and the preferred embodiment logic circuit can be implemented in a single programmable logic chip array or an AND-OR-INVERT integrated logic circuit.

The use of 12-bit data conversion leaves four bits unused in a typical 16-bit wide data bus application. One possible use for the extra four bits would be to store the analog multiplexer address along with the digitized data. This could further simplify the high speed data bus controller task of data sorting and also provide a built in test feature. This option is illustrated by dotted lines 78 in the figure. Another option involves the use of logic gate 64 and switches S1, S2, S3 and S4 along with pull up resistors R1, R2, R3 and R4. These components allow selection of less than 16 monitored channels for equipment with only a few analog data lines. If the hybrid analog acquisition circuit U1 provides synchronous preset features, then logic gate 64 provides the control signal to load the program count value into the hybrids internal address counter with no sacrifice in capability. Should an asynchronous preset function be used, one analog channel, binary count 1111 will be lost by the control logic.

The present invention provides a self-starting free running analog data acquisition circuit without the need for complex control components or algorithms. The data is packed in minimum memory and provided in a format most efficient for transmission over a high speed data bus. A gated logic circuit allows synchronous turn on/turn off to ensure that no data contamination occurs when the circuit is stopped. Greater than 8 bit conversion and storage is provided for high precision metering applications.

Although the present invention has been described in terms of its preferred embodiment, it will be apparent to those skilled in the art that various changes may be made without departing from the scope of the invention. It is therefore intended that the appended claims cover such changes.

What is claimed is:

1. A data acquisition circuit comprising:
   an analog acquisition circuit having a plurality of analog inputs, a plurality of digital outputs, an end-of-conversion terminal, a strobe terminal, and a multiplex address output;
   a random access memory having a plurality of inputs connected to the digital outputs of said analog acquisition circuit, a write terminal, an enable terminal, and an address input connected to the multiplex address output of said analog acquisition circuit;
   an AND logic gate having a first input for receiving an on/off control signal, a second input connected to said strobe output of said analog acquisition circuit, and an output;
   an OR logic gate having a first input connected to said end-of-conversion terminal of said analog acquisition circuit, a second input connected to the output of said AND gate, and an output connected to said strobe terminal of said analog acquisition circuit; and
   a one shot circuit having a first input connected to said strobe terminal of said analog acquisition circuit, and an output connected to said enable and write terminals of said random access memory.

2. A data acquisition circuit as recited in claim 1, wherein said one shot circuit comprises:
   a NOR circuit having a first input connected to said strobe terminal, an inverting input, and an output;
   a trigger circuit having an input and an output, said output being connected to said enable and write terminals of said static random access memory;
   a time delay circuit connected between said NOR circuit and said input of said trigger circuit;
   a second AND logic gate having a first input connected to the output of said trigger circuit, a second input, and an output connect to the inverting input of said NOR circuit; and
   a second OR logic gate having a first input connected to said strobe terminal of said analog acquisition circuit, a second input connected to the output of said second AND logic gate, and a an output connected to the second input of said second AND logic gate.

3. A data acquisition circuit as recited in claim 1, further comprising:
   a NAND logic gate having a plurality of inputs connected to the multiplex address output of said analog acquisition circuit and an output connected to a load terminal of said analog acquisition circuit; and
   means for supplying a preselected address signal to a channel select input of said analog acquisition circuit.

* * * * *